United States Patent [19]
Rost

[11] 4,120,717
[45] Oct. 17, 1978

[54] LOADING DEVICE FOR A TIRE ASSEMBLY DRUM

[75] Inventor: Harry Rost, Munich, Germany

[73] Assignee: Metzeler Kautschuk AG, Munich, Germany

[21] Appl. No.: 800,913

[22] Filed: May 26, 1977

[30] Foreign Application Priority Data

May 26, 1978 [DE] Fed. Rep. of Germany ....... 2623638

[51] Int. Cl.² .......................................... B29H 17/20
[52] U.S. Cl. ............................... 156/405 R; 226/106; 242/183
[58] Field of Search ............... 156/397, 133, 187, 247, 156/249, 394 R, 405, 406; 226/49, 51, 104, 106, 119; 242/180, 181, 183, 186, 75, 52, 78.7

[56] References Cited

U.S. PATENT DOCUMENTS

| | | | |
|---|---|---|---|
| 2,343,954 | 3/1944 | Carlin | 156/406 |
| 2,588,207 | 3/1952 | Cleveland et al. | 156/405 X |
| 2,665,757 | 1/1954 | Stevens et al. | 156/405 |
| 3,014,831 | 12/1961 | Nebout | 156/406 |
| 3,162,562 | 12/1964 | Wenger et al. | 156/406 |
| 3,293,101 | 12/1966 | Cantarutti | 156/405 |
| 3,479,238 | 11/1969 | Kehoe et al. | 156/132 |
| 3,795,563 | 3/1974 | Enders et al. | 156/406 |
| 3,944,457 | 3/1976 | Podvin et al. | 156/405 |

*Primary Examiner*—John E. Kittle
*Attorney, Agent, or Firm*—Armstrong, Nikaido, Marmelstein & Kubovcik

[57] ABSTRACT

A loading device for supplying cord strips, intended for the belt or body of a tire, to a tire assembly drum. The loading device is comprised of a plurality of guide units displaceably mounted for longitudinal movement relative to the tire assembly drum. Each guide unit includes devices for storing a cord strip and a backing strip, for deflecting, for initially separating the cord strip from the backing strip, for final separation and removal of the cord strip from the backing strip, for winding up the backing strip, for guiding the cord strip in a short compensating loop and for delivering the cord strip to the tire assembly drum. The guide units also contain driving mechanisms for each of the above devices. The compensating loop device is rigidly mounted between the separating device and the delivering device.

17 Claims, 5 Drawing Figures

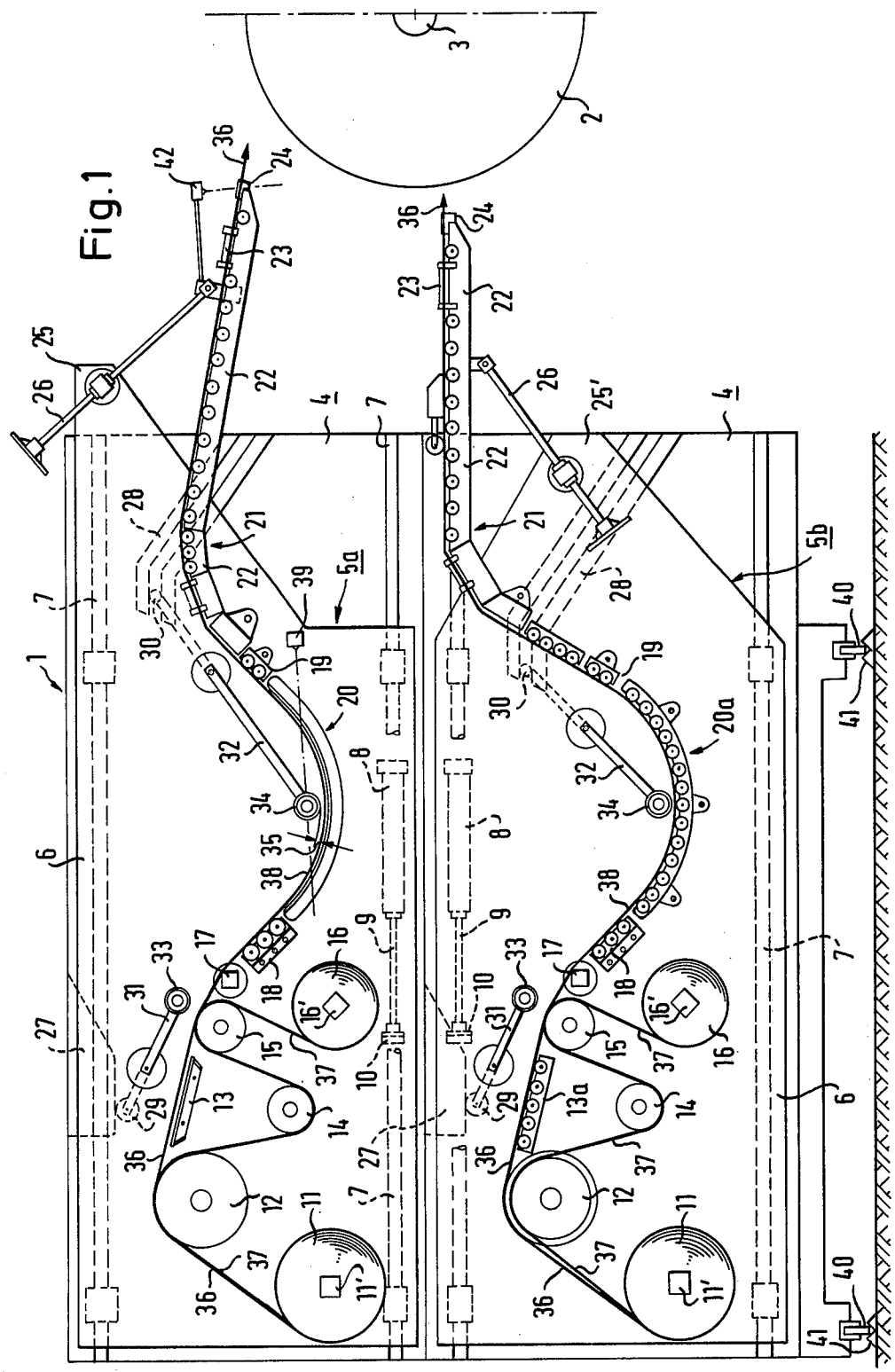

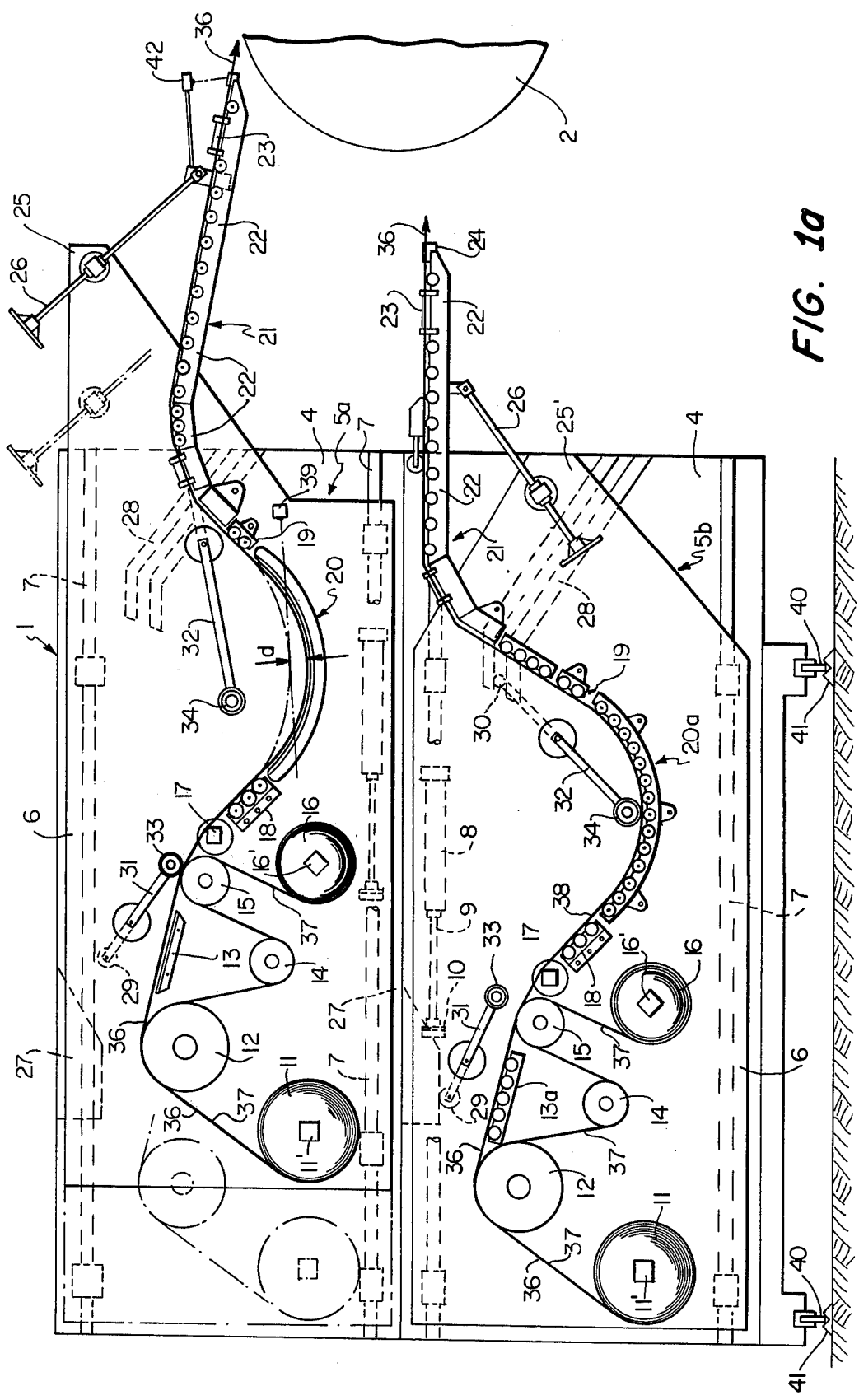

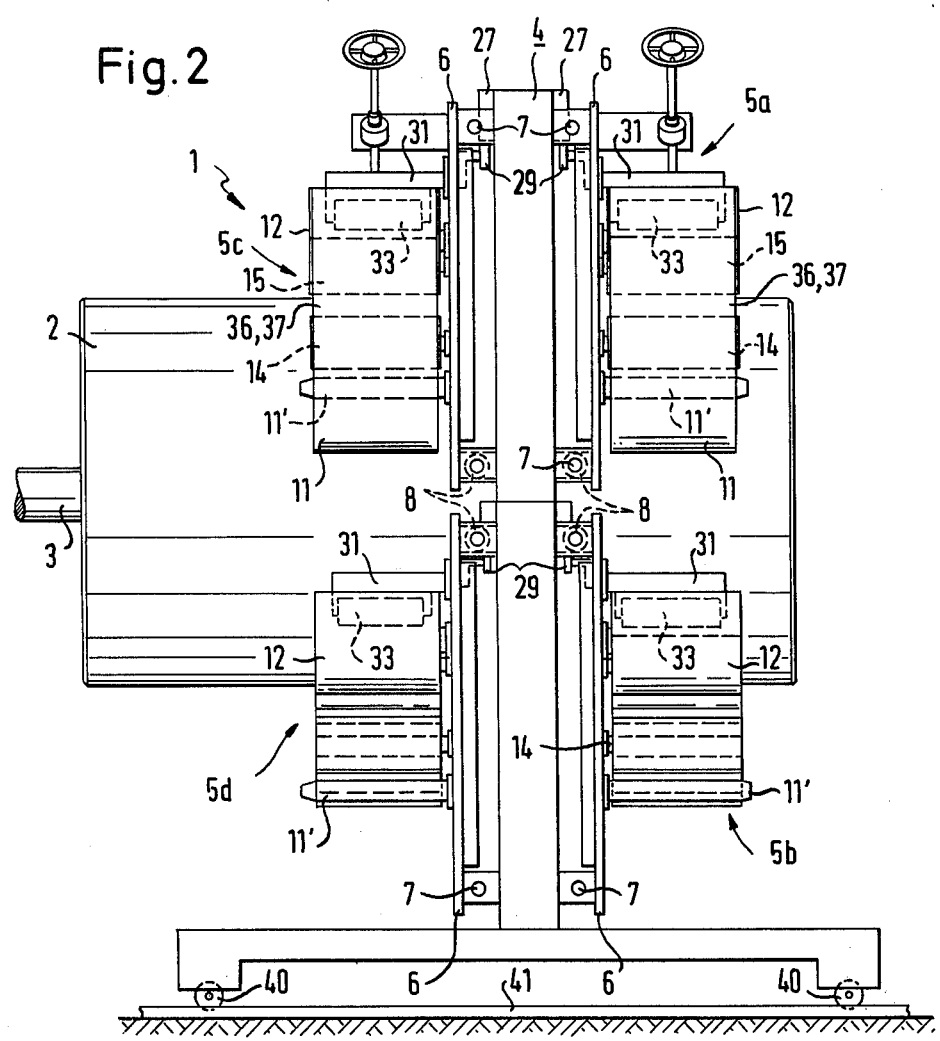

LOADING DEVICE FOR A TIRE ASSEMBLY DRUM

BACKGROUND OF THE INVENTION

1. Field of the Invention

The present invention relates to a loading device for a tire assembly drum wherein a cord strip intended for the belt or body is removed from a storage roll, separated from a backing strip and supplied by means of guide devices to the surface of a tire assembly drum, forming at least one compensating loop in the process.

2. Description of the Prior Art

Loading devices are known wherein the cord strip is removed from a storage roll, stored in the interim in the form of a long compensating loop and then mounted on the tire assembly drum via extensible and retractable guide elements. The compensating loop is designed to counterbalance the reciprocating movement of the guide elements. Specific heavy parts such as steel threads are held in the cord strip by means of a material having a lower yield point such as non-vulcanized rubber. As a result, this cord strip is extremely susceptible to distortion. It can only bear minimal loads transversally of the thread direction. Distortion can even be produced by the inherent weight of the steel cord in the compensating loop. A distorted cord strip causes irregularity of the finished tire and possible rejection of the same. For this reason, the cord strip is generally only supplied indirectly via the backing strip which is designed to prevent sticking of the cord strip on the storage roll.

A disadvantage of this known loading device is that the drive for its individual elements is provided by the shaft of the tire assembly drum, for example, via chain drive systems. These chain drive systems are very long and block the passage between the loading device and the tire assembly drum. Even a slight amount of slack in the chain causes distortion of the cord strip. When the dimensions of the tire assembly drum are varied the operating rate of the individual devices must also be adapted to the different peripheral speed of the drum.

Loading devices are also known wherein the individual devices and the tire assembly drum are driven by separate synchronized direct current motors. However, with continuous cord strip consumption the relationship of the diameter of gyration between the tire assembly drum and the supply roll of the loading device tends to vary. This impedes regular acceleration and deceleration of the individual cooperating elements. The same problems occur when the dimensions of the tire assembly drum are varied.

Another known type of loading device employs an independent rotary current drive for the tire assembly drum and feed rollers. Large cord compensating loops are provided between the individual stations. The elements of the loading device fill the compensating loops associated therewith independently of a straight drum offtake. The tire assembly drum removes the steel cord hanging in this loop independently of the cord strip storage roll. To avoid stresses in the cord strip the unwinding rate must be greater than the circumferential speed of the largest tire assembly drum incorporated in this tire assembly machine. However, if the compensating loops are too large, distortion of the cord strip is frequently produced as a result of its own considerable weight. The compensating loop sags markedly during operating passes in which the tire assembly drum does not withdraw any cord strip. When the compensating loops are long more kinks will be needed in the material and, as a result, the cord strip is again distorted.

As the cord strip is shortened when there is an oblique thread angle at the drum, a long end is left over. In the known loading devices this end is bent back manually or by a mechanical deflecting means and stuck fast on the upper or lower side. Both methods of bending back the end damage the sensitive cord strip.

SUMMARY OF THE INVENTION

The object of the invention is to provide a loading device wherein non-vulcanized adhesive steel cord in the form of a strip having transverse or oblique threads is guided in a distortion-free manner and supplied to the surface of a tire assembly drum. The construction cost should be minimal. It is also intended to operate independently of the dimensions of the tire assembly drum and to ensure reliable delivery of the cord even when the cord strip storage element is virtually empty.

Another object of the invention is to provide a loading device of the type described above which is so designed that it can be simultaneously used to supply a single tire assembly drum with a plurality of different types of cord strip.

This problem is solved according to the invention in the case of a loading device of the type described above in that a plurality of guide units which are displaceable on guides are mounted on a main frame directed towards the tire assembly drum. Each guide unit contains devices for storing, deflecting, initially separating the cord strip from the backing strip, for removal and final separation of the cord strip from the backing strip, for winding up the backing strip and for guiding the cord strip in a compensating loop in the form of a short loop, and for supplying the cord strip to the tire assembly drum. The guide units also contain the drive means for these elements. Each device for forming and guiding the short loop in the respective guide unit is rigidly mounted between the separating device and the delivery unit.

With this type of loading device it is possible, for example, to simultaneously supply four different cord strips to the same tire assembly drum, the cord strip in each individual unit being supported over its entire path and only being exposed to minimal stress loads such that it reaches the tire assembly drum without distortion. In the region of the short loop, in particular, it is not exposed to any stresses effective transversally of the individual reinforcing threads.

Another advantageous feature of the invention is that the main frame is displaceably mounted parallel to the tire assembly drum. As a result, the particular guide unit required can be accurately adjusted with respect to the median plane of the tire assembly drum.

In an advantageous embodiment of the invention two superposed guide units mounted on side panels are held in ball bearings on each side of the main frame and are selectively operable by means of work cylinders mounted on each side panel and the main frame. The elements of each guide unit are mounted in an overhung position on the lateral panels. The advantage of this measure is that a guide unit which is required at a particular time can be moved towards the tire assembly drum and in that the elements for guiding the cord strip are laterally arranged in a readily accessible position. The construction cost of a loading device of this type is very low and the progress of the cord strip can be reliably controlled at all times.

One embodiment of the loading device according to the invention is characterized in that the course of the cord strip and its backing strip in each guide unit is such that both are unrolled together from a storage roll and supplied to a deflecting roller. A separating roller disposed at a lower level temporarily removes the backing strip whereupon the cord strip is guided via a guide path connected in series with the separating roller and in the region of a take-up roller it is reunited with the backing strip which has just been advanced thereto. The backing strip is finally removed behind the area of the take-up roller in the region of a separating device and is assembled on a collecting roller disposed at a lower level. The cord strip is then guided in a curved cage comprising a sliding guide surface and if forms a short loop. The output of the curved cage discharges into roller boxes which comprise an adjustably mounted mouthpiece with lateral guide elements for the cord strip and which are suspended on an adjusting spindle on the side panel and directed towards the tire assembly drum. As the short loop constituting a material reserve remains stored in a cage, the cord strip is not unduly elongated and is not subject to any kinks as a result of being guided in a steady manner.

An advantageous feature is that roller guides comprising non-stick coatings are arranged at the input and output of the cage. These prevent the cord strip from sagging after it leaves the take-up roller or after it enters the roller cage. In one embodiment of the invention the guide path and the cage for cord strips comprising acute thread angles consist of metal plates comprising non-stick coatings.

In another embodiment of the invention, to ensure that the cord strip is not overstretched in the region of the short loop when the protruding cord strip end is being returned, guide paths for pendulum rollers mounted on the side panels and controlling the bottom of the cage are mounted on the main frame in the region of each side plate. These pendulum rollers are automatically guided by the displacement of the side panel and thus, after the recoil operation, it is ensured that the cord strip will be supported on the bottom of the cage. To achieve this the pendulum roller is formlockingly lowered in the region of the cage via a lever system from the guide path towards the bottom of the cage to a lowest position (thickness of the cord strip plus 2mm).

According to another feature of the invention, to ensure that the backing strip is separated from the cord strip, the separating device consists of a stripper square disposed immediately below the cord strip. The stripper square only rotates during a forward movement and its edges lightly strike the underside of the cord strip. It causes the cord strip to vibrate slightly so that its adhesive underside is easily separated from the backing strip.

In another embodiment the drive elements consist of chain drive systems or the like which are driven by means of a drive motor mounted in the side panel. This drive motor may consist, for example, of a short-circuit rotor electromotor comprising an alternating direction of rotation. The chain systems are driven via an electromagnetic coupling and brake combination comprising high speed electrical energization and deenergization. The arrangement of the drive elements in the side panels provides the entire loading device with a compact structure.

As it is essential to ensure that the individual surfaces of the elements in the guide units coming into contact with the cord strip, are operated at a uniform circumferential speed, in another embodiment the roll, separating roller and deflecting roller are connected to the chain wheels associated therewith via adjustable slipping clutches. These slipping clutches compensate irregular movements.

It is also necessary to ensure that the storage roll having the cord strip would thereon does not continue to rotate after its guide unit has been stopped. To ensure that this is prevented, the storage roll according to the invention is loading counter to the wind-off direction of the cord strip by a permanently operating braking device.

The drive means for the loading device must operate reliably and without breakdowns for a long period of time. It should also be housed as compactly as possible. This is achieved in the case of one embodiment of the invention in that a reversing drive means which comprises an idle running mechanism and two chain wheels and which is acted on by a coupling via a chain loop is disposed in each side panel. This reversing drive means drives the chain wheel of the deflecting roller and the chain wheel of the take-up roller via the first chain wheel by means of a chain loop and it is connected via the second chain wheel with the chain wheel of the storage roll. This drive system and the method of connecting together the individual chain wheels has proved itself in practice and it has been found that the cord strip is not subject to any distortion. Other features of the loading devices according to the invention will be made apparent in the accompanying sub-claims. An embodiment of a loading device according to the invention is suitable for supplying a tire assembly drum with tire body material, i.e., with a cord stip having an obtuse phase angle, if two feed stations disposed in series are provided in the main frame with two feed devices disposed in parallel on top of one another projecting at the front end of the main frame and if the main frame is displaceable towards the tire assembly drum. This configuration is advantageously used for tire body cord as this is substantially broader and heavier than the cord material used for the belt.

BRIEF DESCRIPTION OF THE DRAWING

The invention will be described in further detail in reference to the accompanying drawings, in which:

FIG. 1 is a side view of a loading device;

FIG. 1a is a side view of the loading device in a work position;

FIG. 2 is a rear view of the loading device shown in FIG. 1, in which the cord strip is not represented in the two lower guide units;

DESCRIPTION OF THE PREFERRED EMBODIMENT

Figure 3:
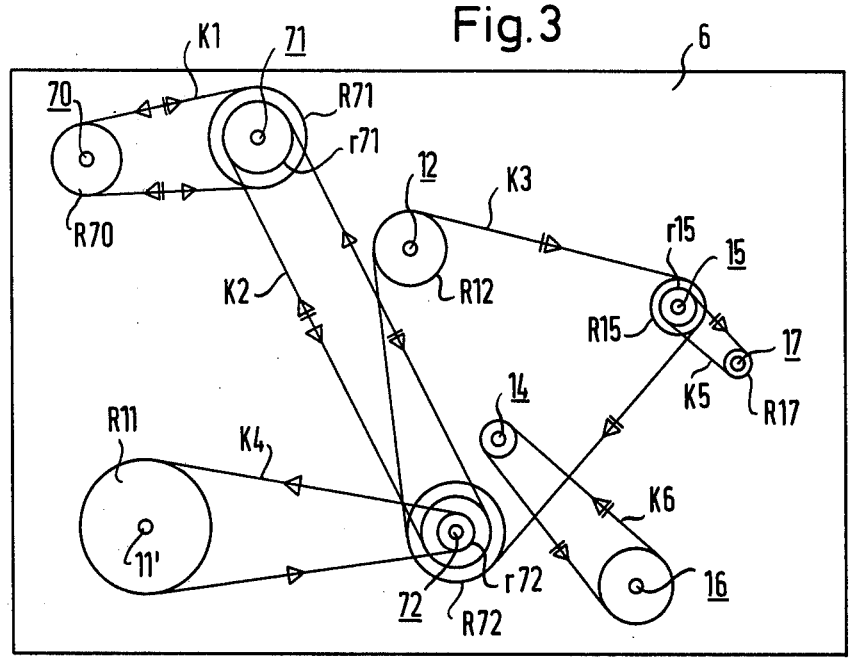
FIG. 3 is a drive diagram of a guide unit of the loading device shown in FIGS. 1 and 2.

In FIGS. 1 and 2 reference 1 designates the loading device provided for a tire assembly drum 2 mounted on its axis of rotation 3. The loading device 1 comprises a solid main frame 4, at the sides of which two superposed guide units 5a, 5b, 5c and 5d are disposed.

The guide units 5a–d are supported on side panels 6 which are displaceable via extensible positioning guides 7 on the main frame 4 in the direction of the tire assembly drum 2. Work cylinders 8 are disposed between the side panels 6 and the main frame 4. The work cylinders 8 engage on attachments 10 via their piston rods 9 and are adapted to displace the side panels 6 in the longitudinal direction of the main frame 4.

In each of the guide units 5a–d a storage roll 11 is rotatably mounted on a mandrell 11'. A cord strip 36 and a backing strip 37 are wound on this storage roll 11. The backing strip 37 is designed to prevent the cord strip 36 from sticking to itself. The cord strip 36 and the backing strip 37 are guided over a deflecting roller 12 which is adjoined at its tangent by a guide path 13 for the cord strip 36; the backing strip 37 being removed by a separating roller 14 disposed at a lower level. A take-up roller 15 is disposed behind the guide path 13. On the take-up roller 15 the backing strip 37 is again fed beneath the cord strip 36 before it is again removed and wound on a collecting roller 16 which is rotatably mounted on a mandrel 16'. In this region the separation of the cord strip 36 from the backing strip 37 is assisted by means of a separating device 17 disposed beneath the cord strip 36. This separating device 17 is preferably in the form of a stripper square. A cage 20 is adjacent to the separating device 17. This cage 20 is curved and is used as a support for a short loop 38 formed from the cord strip 36.

The input and outputs of the cage 20 are controlled by a roller guide 18 or 19. An articulated feed device 21 consisting of individual roller boxes is adjacent to the cage 20. With lateral guide rolls 23 and a mouthpiece 24 the feed device 21 extends tangentially to the surface of the tire assembly drum 2. A bracket 25 is disposed at the front end of the side panel 6. This bracket 25 acts as a stop for a spindle 26. The articulated feed device 21, resp., the position of the mouthpiece 24 is adjustable via the spindle 26. Guides 27 and 28 in which slide rollers 29 or slide rings 30 are guided, are mounted on the main frame 4. These each control a pendulum roller 33 and 34 via levers 31 and 32. The pendulum roller 33 is associated with the upper side of the take-up roller 15 and the pendulum roller 34 is adapted to be lowered to the bottom of the cage 20. However, it can only be lowered to the bottom of the cage 20 to within 2 mm plus the thickness of the respective cord strip, as indicated by the space 35. The cage 20 is monitored via a light barrier 39 and the mouthpiece 24 by a light barrier 42.

The main frame 4 is displaceable by means of wheels 40 which run on rails 41 parallel to the axis of rotation 3 of the tire assembly drum 2.

In guide unit 5a the guide path 13 and the cage 20 consist of a metal or plastic element covered with a non-stick coating to enable the cord strip to slide readily thereon. This configuration is especially suitable for cord strips having an acute thread angle.

The lower guide unit 5b comprises a guide path 13a consisting of rollers connected in series instead of the metal guide path. Similarly, the cage for forming the short loop 38 is in the form of the cage 20a comprising individual tread rollers. The rollers of the guide 13a and the cage 20a are advantageously provided with a non-stick coating so that the cord strip is exposed to very little frictional resistance. The bracket 25' of the guide unit 5b is located below the roller box 22. It again serves as an abutment for a spindle 26 by means of which the mouthpiece 24 can be adjusted to the tangent of the tire assembly drum 2.

FIG. 1a illustrates the upper feed unit 5a of the feed device extended by means of the pressure medium cylinder in the direction of the tire assembly drum 2 and is also in its work position.

FIG. 3 is a diagrammatic view of the drive system for one of the guide units 5a–d. These drive systems are disposed on or behind the side panel 6, thereby enabling all the elements of each guide unit to be mounted in a horizontal overhung or cantilevered position. The core of the drive system is a drive motor 70 which is in the form of a short-circuit rotor electromotor comprising an alternating direction of rotation. This motor is connected via its chain wheel R70 and a chain loop K1 to the chain wheel R71 via an electromagnetic coupling and brake combination 71. The motor can be driven, stopped and reversed with high speed electrical energization and deenergization. It comprises another chain wheel r71 which is connected to a reversing gear 72 via a chain loop K2. The reversing gear 72 comprises tow chain wheels R 72 and r72 which are both so mounted in the reversing gear 72 via free running mechanisms that one is free running when the other is rotating. The chain wheel r72 is connected to the chain wheel r11 of the mandrel 11' of the storage roll 11 via a chain loop K4. The chain wheel R72 of the reversing gear is connected by a chain loop K3 both to the chain wheel R 12 of the deflecting roller 12 and to the chain wheel R 15 of the take-up roller 15. The take-up roller 15 also possesses a second chain wheel r15 which is connected to a chain wheel R17 of the separating device 17 via a chain loop k5. The separating roller 14 is connected via a chain loop K6 to the collecting roller 16 for the backing strip. The +▷arrows indicate the forward direction for the cord strip and the —▷arrows represent the return direction for the cord strip. It is particularly apparent from claim 3 that during the forward movement (+▷ arrows) only the deflecting roller 12 and the take-up roller 15 (including the separating device 17) and (indirectly) the separating roller 14 and the backing strip collecting roller 16 ↓ via the backing strip, are driven. During the return movement which is again started via the drive means 70 only the mandrel 11' is driven by the chain loop K4 while the other rolls and rollers are without drive as a result of the free running of the reversing gear 70 and are freely rotatable.

During the return movement of the cord strip these non-driven rollers are preferably mounted via free running mechanisms on their chain wheels, enabling them to rotate with the cord strip with very little rotational resistance.

Figure 4:
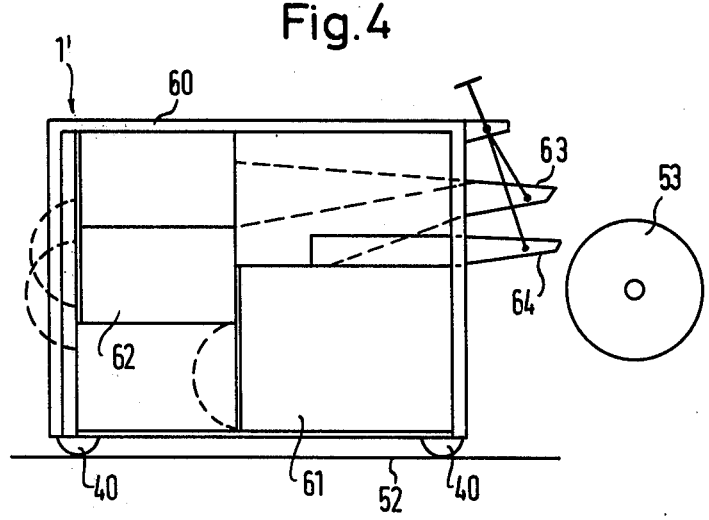
FIG. 4 is a diagrammatic view of a loading device for supplying a tire assembly drum with tire body cord strip.

FIG. 4 discloses a loading device 1' which can be used to feed broad and heavy body cord strips. This loading device 1' requires a solid main frame 60. Two guide units 61 and 62 with their feed devices 63 and 64 connected directly in series therewith and partially overlapping one another are mounted on guides 52 in the main frame 60. The rolls of body cord strip are introduced into the loading device 1' from the rear and suspended in the relevant loading station. The loading device 1' is so designed that the normally extremely heavy body cord strip rolls can be inserted by means of hoists. As in the embodiments shown in FIGS. 1 and 2, the feed devices 63 and 64 are again directed tangentially to the surface of the tire assembly drum 53.

The modus operandi of a loading device according to the invention will now be described:

The cord strip 36 is unwound from the storage roll 1 together with its backing strip 37 and passes to the deflecting roller 12. The backing strip 37 is removed from the cord strip 36 by the separating roll 14 behind the deflecting roller 12. The cord strip 36 then passes over the guide 13 or 13a to the actual take-up roller 15 where the backing strip 37 is again placed beneath it. With the assistance of the backing strip 37, the take-up roller 15 exerts sufficient pull directly on the cord strip 36 to advance the same. In the region of the take-up roller 15 the cord strip 36 is again briefly reunited with the backing strip 37 under the action of the pendulum roller 33. Until then the cord strip 36 constantly rests on the backing strip 37 and is protected by the same from distortion caused by sagging or by its own weight.

After the take-up roller 15, the cord strip 36 and the backing strip 37 are finally separated. The backing strip 37 is wound on a collecting roller 16 while the cord strip 36 is guided via the separating device 17 and the roller guide 18 into the cage 20 or 20a. The separating device 17 rotates at a faster rate beneath the cord strip 36, thereby causing the strip to vibrate slightly and enabling it to be readily separated from the backing strip 37. From the cage 20 or 20a, in which the cord strip 36 is supported without stress or distortion, it is supported by lateral guides and inserted into the articulated feed device 22. From there it is supplied tangentially to the surface of the tire assembly drum. In the course thereof it is subjected to a slight pulling stress, but this is negligible.

The feeding of the short loop 38 is controlled by the light barrier 39 in the region of the cage 20. As soon as the light barrier 39 becomes free as the strip material is removed, the drive means, more specifically, the take-up roller 15 starts up and supplies the cord strip 36 until the cage 20 is again filled. This supplying operation is continually repeated with very small feed quantities, thereby preventing any sagging of the cord strip 36.

The storage roller 11 is prevented from following be means of a permanently effective brake and an auxiliary electromagnetic brake. This auxiliary electromagnetic brake, which is not represented, is switched in exactly the same manner as the electromagnetic brake 71 comprising high speed electrical energization and deenergization. As a result, both the supplying of the short loop 38 and the deceleration of the storage roll 11 take place at short consecutive intervals. The rotating mass of the drive motor 70 is used as a gyrating mass for accelerating the storage roll 11.

The circumferential speeds of the deflecting roller 12, of the separating roller 14 and the take-up roller 15- and thus the feeding rate of the cord strip 36 into the short loop 38 - is about 5% faster than the circumferential rate of the largest storage roll 11.

To prevent marked adhesion of the cord strip 36 to the backing strip 37 in the region between the pendulum roller 33 and the take-up roller 15, the pendulum roller 33 is raised into the rest position by the guide 27 during the return movement of the respective guide unit 5a–d. During the return movement of the guide unit 5a–d the idle roller 34 drops down in the cage into the rest position such that the cord strip 36 is made to lie flat in the cage.

The return movement of the cord strip 36 is controlled in the following manner:

The drive motor 70 first changes the direction of rotation. The coupling 71 is switched on until the light barrier 42 disposed at the output of the roll box 22 produces a signal. The chain wheels R 71 and r71 with opposite free running systems are disposed on the drive shaft of the coupling 71. When cord is being fed into the short loop 38 the chain wheel r71 for the return movement idles. In the opposite direction of rotation the chain wheel R 71 producing the forward movement of the cord caused to idle. Accordingly, during the return movement, the cord strip 36 and the backing strip 37 are returned. All other rolls and rollers are drawn backwards in the idle state by the backing strip 37. The separating device 17 is uncoupled separately and remains still. The difference in the individual body diameters is compensated by a friction clutch.

What is claimed is:

1. A loading device for supplying cord strips, intended for the belt or body of a tire, to a tire assembly drum, the loading device being comprised of at least one guide unit, said at least one guide unit comprising:
   a storage roll, said storage roll being adapted to store said cord strip and a backing strip;
   a deflecting means receiving said cord strip and backing strip from said storage roll;
   initial separating means for separating said cord strip from said backing strip;
   a take-up roller means temporarily reuniting said cord strip and said backing strip;
   final separating means for separating said cord strip from said backing strip and for storing said removed backing strip;
   compensating loop means for forming said cord strip into a short loop, said compensating loop means comprising a curved cage means including sliding guide surfaces;
   feed means for feeding said cord strip onto said tire assembly drum, said compensating loop means being rigidly positioned between said final separating means and said feed means;
   drive means for driving each said respective means; and
   extensible positioning guides for longitudinally positioning said guide unit relative to said tire assembly drum.

2. A loading device as claimed in claim 1 further comprising a main frame wherein said main frame is displaceably mounted parallel to the tire assembly drum axis.

3. A loading device as claimed in claim 2 wherein a plurality of guide units are provided characterized in that two superimposed guide units are mounted on side panels on each side of the main frame and are held in guides and are selectively displaceable by means of a work cylinder mounted on each side panel and the main frame and in that the elements in each guide unit are mounted in an overhung position on the side panels.

4. A loading device as claimed in claim 1 wherein said feed means includes roll boxes which comprise an adjustably mounted mouthpiece with lateral guide elements for the cord strip and which are suspended on an adjusting spindle on a side panel and directed toward the tire assembly drum.

5. A loading device as claimed in claim 1 further comprising roller guides disposed at the input and output of the cage, said roller guides being provided with non-stick coatings.

6. A loading device as claimed in claim 1 further comprising a guide path interposed between said deflecting means and said final separating means, and the cage for the cord strip having an acute thread angle consisting of metal plates comprising non-stick coatings.

7. A loading device as claimed in claim 1 characterized in that the guide path and the cage for the cord strips having an obtuse thread angle consist of rollers provided with a non-stick coating.

8. A loading device as claimed in claim 1 further comprising a plurality of guide paths and pendulum rollers, wherein said guide paths for said pendulum rollers mounted in side panels and controlling the bottom of the curved cage are mounted on a main frame in the region of the side panels.

9. A loading device as claimed in claim 1 characterized in that the pendulum roller in the region of the cage is adapted to be lowered in a formlocking manner via a lever system from the guide path to the bottom of the cage as far as a lowest position equal a short distance apart from the cord strip, for example, with 2mm spacing.

10. A loading device as claimed in claim 1 characterized in that the final separating means comprises a stripper square disposed directly below the cord strip.

11. A loading device as claimed in claim 1 characterized in that the drive comprise chain drive means which are driven via an electromagnetic coupling and brake combination comprising high speed electrical energization and deenergization by a drive motor mounted in a side panel.

12. A loading device as claimed in claim 1, characterized in that the deflecting means, initial separating means and final separating means are connected to associated chain wheels via adjustable release clutches.

13. A loading device as claimed in claim 1, characterized in that the storage roll is charged in the opposite direction to the unwinding direction of the cord strip by a permanently operating braking device.

14. A loading device as claimed in claim 1, further comprising a reversing gear system comprising a free-running system and two chain wheels acted on by a coupling via a chain loop is disposed in each side panel, said reversing gear system driving a chain wheel of the deflecting roller means and a chain wheel of the take-up roller via a first chain wheel by means of a chain loop and being connected to a chain wheel of the storage roll via a second chain wheel.

15. A loading device as claimed in claim 1, wherein said compensating loop said curved cage is controlled via a light barrier passing through the same in the form of a secant.

16. A loading device as claimed in claim 4, characterized in that the mouthpiece of the feed means is controlled by a light barrier.

17. A loading device as claimed in claim 3, characterized in that two loading stations disposed in series with parallel superposed feed devices projecting at the front end of the main frame are disposed in the main frame and the main frame is displaceable in the direction of the tire assembly drum.

* * * * *